UNITED STATES PATENT OFFICE.

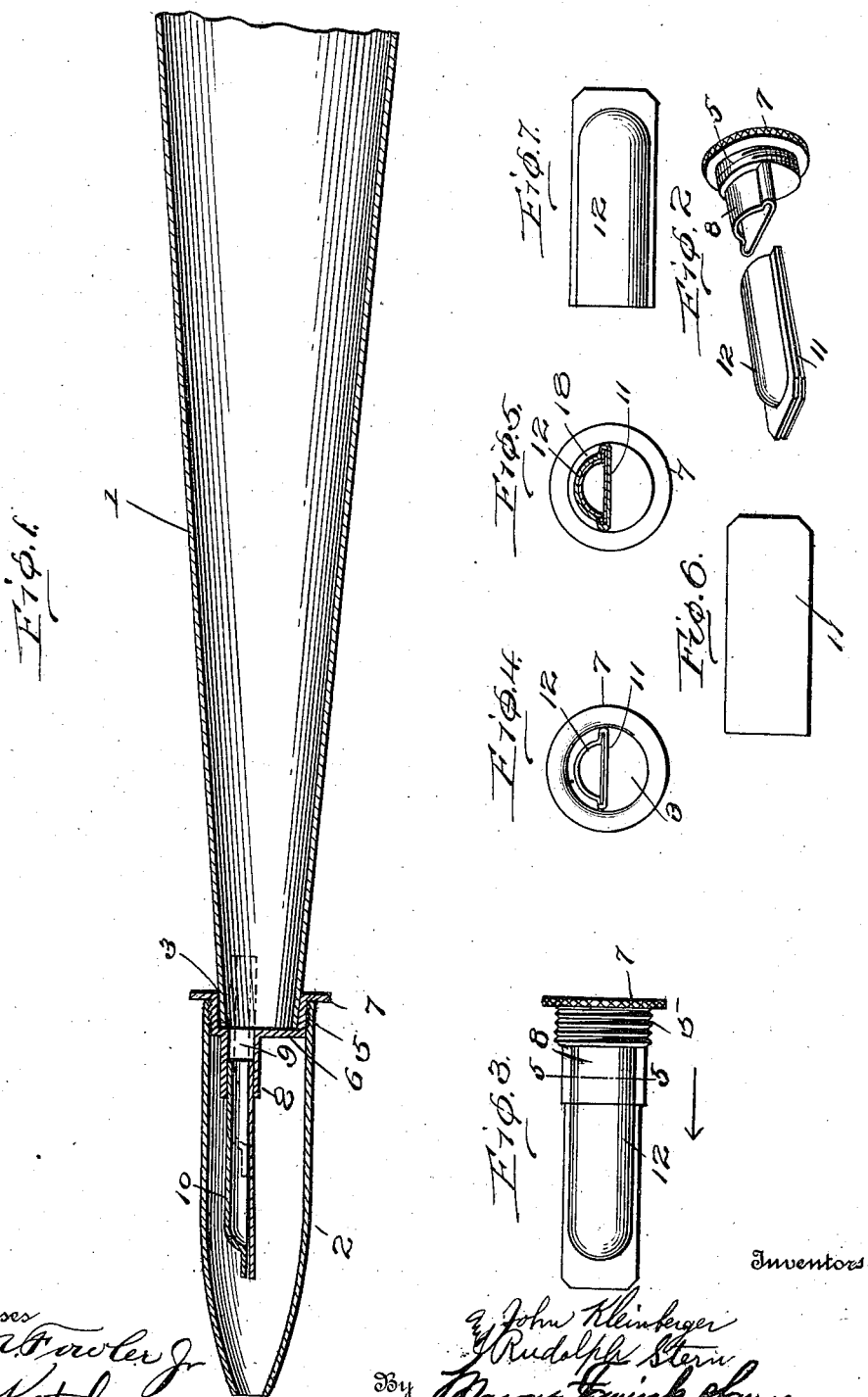

JOHN KLEINBERGER, OF BROOKLYN, AND RUDOLPH STERN, OF NEW YORK, N. Y., ASSIGNORS TO AMERICAN MARINE LAMP MFG. CO., OF NEW YORK, N. Y., A CORPORATION OF NEW YORK.

FOG-HORN.

975,960.

Specification of Letters Patent. Patented Nov. 15, 1910.

Application filed December 2, 1909. Serial No. 531,033.

*To all whom it may concern:*

Be it known that we, JOHN KLEINBERGER and RUDOLPH STERN, citizens of the United States and of Hungary, respectively, and residents of Brooklyn, in the county of Kings and State of New York, and New York, in the county and State of New York, respectively, have invented certain new and useful Improvements in Fog-Horns; and we do hereby declare the following to be a full, clear, and exact description of the invention, such as will enable others skilled in the art to which it appertains to make and use the same.

This invention relates to improvements in horns, and particularly to what are commonly known as fog horns, and has for an object the provision of improved means for adjusting and holding in position the reed and associated parts.

Another object in view is the arrangement in a fog horn, of a reed formed so as to be adjusted longitudinally for varying the tone of the horn.

A still further object in view is the arrangement in a horn, of a reed formed with a tongue and plate, and a holder for receiving the tongue and plate which will permit the longitudinal adjustment of the reed through the holder, or partially therethrough for regulating the tone of the reed to the size of the horn.

With these and other objects in view the invention comprises certain novel constructions, combinations, and arrangement of parts as will be hereinafter more fully described and claimed.

In the accompanying drawings: Figure 1 is a longitudinal section through a horn embodying the invention. Fig. 2 is a perspective view of the reed and holder shown in a separated condition for the purpose of illustration. Fig. 3 is a top plan view of the reed and holder in an assembled condition but removed from the horn. Fig. 4 is an end view of the structure shown in Fig. 3, looking in the direction of the arrow. Fig. 5 is a section on line 5—5 through the structure shown in Fig. 3, looking in the direction opposite to the arrow. Fig. 6 is a top plan view of the reed tongue. Fig. 7 is a plan view of the reed plate.

In forming a horn according to the present invention, a horn and mouth piece of any desired kind may be provided for receiving a reed and a removable holder, the holder being formed with a socket through which the reed may be forced whenever desired, though ordinarily the reed is left permanently in one position in the holder after having been properly adjusted. The reed may be removed from the socket for renewal, inspection, or cleaning as desired, and again replaced. In forming the reed and socket the same are arranged to permit the reed to be forced entirely through the socket so that the reed may be adjusted to any desired extent for varying the tone as desired. In this way the tone and volume can be controlled and regulated for varying sized horns without necessitating changing or cutting of the reed.

In order that the invention may be more clearly understood an embodiment of the same is shown in the accompanying drawings, in which 1 indicates the horn proper and 2 a mouth piece secured to horn 1 by being forced thereover, so that the end of the horn will fit in the cavity 3 of a reed holder 6. Mouth piece 2 is provided with a threaded portion 4 for receiving the threads 5 of the reed holder 6. The reed holder 6 is provided with a flange 7 for use in securing the holder in position in mouth piece 2, and limiting the inward movement thereof. Holder 6 is also provided with a projection 8 which defines a socket 9 into which a reed 10 is designed to be fitted.

Reed 10 may be adjusted longitudinally to any desired extent, and if desired may be forced entirely through socket 9. In this way the reed may have the tongue 11 thereof, and also the plate 12, shortened as far as the vibration of the tongue is concerned without actually cutting off or shortening the tongue 11 or the plate 12. As will be evident the plate 12 in tongue 11 can be pulled back and forth and the horn tested until the distance from the end of member 8 and the end of the tongue is just the right length to cause a proper vibration of the tongue for providing the desired tone and volume of sound in horn 1. Tongue 11 is bent or bowed slightly arc-shape and plate 12 is preferably straight so that air may pass between the tongue and the plate for providing proper vibration of the tongue.

What we claim is:

1. In a horn, a body portion, a mouth piece, a reed formed with a tongue and a substantially semi-tubular member, and a holder formed with an extension defining a socket and guide for receiving and guiding said reed, said reed being bodily slidably mounted in said socket for permitting adjustment thereof, whereby the vibrating parts of the tongue of said reed may be varied in length.

2. In a horn, a body portion, a reed holder arranged to fit over the end of said body portion and formed with an extension, said extension defining a socket and a pair of guide-ways, a reed positioned in said socket formed with guiding means engaging said guide-ways in said extension, and a mouth piece surrounding said reed.

3. In a horn, a horn proper, a reed holder secured to said horn proper and formed with an extension having an aperture therethrough and guide-ways therein, a reed positioned in said reed holder constructed with guides engaging said guide-ways for guiding the reed in its movement, and a mouth piece fitting over said reed and said reed holder and secured to said reed holder.

4. In a horn, a horn proper, a reed holder secured to said horn proper and formed with a reduced extension having an aperture therethrough provided with ways on each side, a reed formed with a substantially semi-tubular plate having flanges extending therefrom for fitting into the ways of said extension, and a tongue covering the open side of the semi-tubular plate and extending for the full width thereof, including the flanges, said tongue being designed to fit into said opening and be longitudinally adjustable at the same time as said semi-tubular plate, and a mouth piece fitting over said reed and said reed holder and secured to said reed holder.

In testimony whereof we affix our signatures in presence of two witnesses.

JOHN KLEINBERGER.
RUDOLPH STERN.

Witnesses:
  HUGO MOCK,
  MARY PERRY.